(12) United States Patent
Kojima et al.

(10) Patent No.: US 11,962,502 B2
(45) Date of Patent: Apr. 16, 2024

(54) CONTROL APPARATUS, COMMUNICATION SYSTEM, CONTROL METHOD AND PROGRAM

(71) Applicant: Nippon Telegraph and Telephone Corporation, Tokyo (JP)

(72) Inventors: Hisashi Kojima, Musashino (JP); Shingo Okada, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 24 days.

(21) Appl. No.: 17/779,323

(22) PCT Filed: Nov. 29, 2019

(86) PCT No.: PCT/JP2019/046817
§ 371 (c)(1),
(2) Date: May 24, 2022

(87) PCT Pub. No.: WO2021/106201
PCT Pub. Date: Jun. 3, 2021

(65) Prior Publication Data
US 2022/0400136 A1  Dec. 15, 2022

(51) Int. Cl.
*H04L 61/45* (2022.01)
*H04L 45/745* (2022.01)

(52) U.S. Cl.
CPC .................. *H04L 45/745* (2013.01)

(58) Field of Classification Search
None
See application file for complete search history.

(56) References Cited

U.S. PATENT DOCUMENTS

| | | |
|---|---|---|
| 8,184,641 B2 * | 5/2012 | Alt ............... H04L 61/2564 370/467 |
| 2003/0237002 A1 * | 12/2003 | Oishi ............... H04L 63/08 726/10 |

(Continued)

FOREIGN PATENT DOCUMENTS

| JP | 2006074594 | 3/2006 |
|---|---|---|
| JP | 2007201771 | 8/2007 |

(Continued)

OTHER PUBLICATIONS

Cisco Systems G. K., "Cisco SD-WAN (Viptela) Explanation," cisco.com, Feb. 2018, retrieved from URL <https://www.cisco.com/c/m/ja_jp/solutions/enterprise-networks/sd-wan.html>, 7 pages (with English Translation).

(Continued)

*Primary Examiner* — Christopher B Robinson
(74) *Attorney, Agent, or Firm* — Fish & Richardson P.C.

(57) ABSTRACT

A control apparatus configured to control communication between locations includes a database configured to store, for each location, a key and an IP address of CPE in association with each other, a search section configured to receive a CPE address request message including a key of a communication destination from CPE of a certain location and search the database to acquire an IP address of CPE corresponding to the key of the communication destination, and a response section configured to transmit the IP address of the CPE acquired by the search section to the CPE that is a transmission source of the CPE address request message.

8 Claims, 10 Drawing Sheets

(56) References Cited

U.S. PATENT DOCUMENTS

| | | | |
|---|---|---|---|
| 2008/0125077 A1* | 5/2008 | Velazquez | H04L 12/66 |
| | | | 455/404.2 |
| 2011/0026510 A1* | 2/2011 | Matsumura | H04L 65/1036 |
| | | | 370/338 |
| 2011/0202956 A1* | 8/2011 | Connelly | H04N 21/43637 |
| | | | 725/38 |
| 2012/0084359 A1 | 4/2012 | Mizutani | |
| 2013/0100913 A1* | 4/2013 | Scherer | H04L 63/08 |
| | | | 370/329 |
| 2013/0303108 A1* | 11/2013 | Athias | H04M 1/72424 |
| | | | 455/404.2 |
| 2019/0190837 A1* | 6/2019 | Wright | H04L 47/22 |
| 2020/0304458 A1* | 9/2020 | Fujii | H04L 12/4633 |
| 2023/0065919 A1* | 3/2023 | Smith | H04L 61/5076 |

FOREIGN PATENT DOCUMENTS

| | | |
|---|---|---|
| JP | 2012078902 | 4/2012 |
| JP | 2018157258 | 10/2018 |

OTHER PUBLICATIONS

Filsfils et al., "Segment Routing Architecture Request for Comments: 8402," Internet Engineering Task Force (IETF), Jul. 2018, retrieved from URL <https://tools.ietf.org/html/rfc8402>, 32 pages.

* cited by examiner

Fig. 3

| COMMUNICATION DESTINATION ID | IP ADDRESS OF CPE |
|---|---|
| EID#2 | IP#2 |
| EID#3 | IP#3 |
| ... | ... |

Fig. 5

| COMMUNICATION DESTINATION ID | IP ADDRESS OF CPE |
|---|---|
| EID#1 | IP#1 |
| EID#2 | IP#2 |
| EID#3 | IP#3 |
| ... | ... |

CONTROL APPARATUS, COMMUNICATION SYSTEM, CONTROL METHOD AND PROGRAM

CROSS-REFERENCE TO RELATED APPLICATIONS

This application is a National Stage application under 35 U.S.C. § 371 of International Application No. PCT/JP2019/046817, having an International Filing Date of Nov. 29, 2019. The disclosure of the prior application is considered part of the disclosure of this application, and is incorporated in its entirety into this application.

TECHNICAL FIELD

The present invention relates to a technique of transmitting/receiving packets between locations.

BACKGROUND ART

Representative examples of communication service for the existing enterprise networks include IP virtual private networks (IP-VPNs) and software-defined WANs (SD-WANs). The IP-VPN is a communication service that securely and seamlessly connects locations of enterprises using a tunneling technique or the like.

The SD-WAN (NPL 1) which is a developed form of the IP-VPN has features of achieving plug & play through centralized batch control from a controller managed by an SD-WAN provider or utilizing a plurality of WAN services in combination. However, the SD-WAN basically has no difference from the IP-VPN in that it is a service to interconnect hosts and networks between locations of enterprises using an Internet protocol (IP).

On the other hand, Segment Routing IPv6 (SRv6) (NPL 2) has gained attention as a new WAN technique that operates on an Internet Protocol version 6 (IPv6) network. The use of SRv6 allows for not only path control, tunneling, and the like only with the IPv6 layer but also network programming by listing processing of packets in the header of IPv6 packets.

CITATION LIST

Non Patent Literature

NPL 1: Cisco SD-WAN (Viptela), https://www.cisco.com/c/m/ja_jp/solutions/enterprise-networks/sd-wan.html, retrieved from the Internet on Nov. 25, 2019.
NPL 1: IETF RFC8402 "Segment Routing Architecture" https://tools.ietf.org/html/rfc8402, retrieved from the Internet on Nov. 25, 2019.

SUMMARY OF THE INVENTION

Technical Problem

In recent years, there has been an increasing demand from enterprise users for new forms of network utilization, such as Internet of Things (IoT) and content delivery.

The IoT is not sufficiently achieved only with the existing seamless connection between locations of enterprises and needs requirements to be fulfilled, such as centralized implementation of collection of sensor information and device control of IoT devices from the cloud or achievement of seamless communication with moving devices such as automobiles (connected cars).

Furthermore, there is an increasing demand from enterprises that provide services to end users for a Contents Delivery Network (CDN) on which large volume data represented by moving images and software updates can be efficiently delivered to many end users.

Such functions and services are insufficiently achieved only with the existing IP-VPN or SD-WAN. The IP-VPN and the SD-WAN have a mechanism to transfer, based on an IP address of a communication destination, IP packets to the location in which the host holding the IP address is present.

However, because a correspondence between an IP address and a location is fixed in the mechanism of the existing IP-VPN or SD-WAN, it is not possible for the mechanism to respond to a dynamically moving location. In addition, when it is aimed to acquire a "content" rather than a host as on a CDN, a mechanism to search for a location based on a content name (URI, etc.) rather than the IP address of a host is needed, but there is no such mechanism in the existing IP-VPNs or SD-WANs.

In other words, the existing technology is problematic in that only a connectivity of communication can be achieved, and a desired service that can deal with dynamic movements and acquisition of content needs to be made from scratch when it is constructed, which requires development costs and development periods.

The present invention has been made in view of the foregoing circumstances and aims to provide a technique of interconnecting locations that enables not only a connectivity of communication to be achieved but also a desired service to be easily constructed.

Means for Solving the Problem

According to the disclosed technique, a control apparatus that controls communication between locations, the control apparatus including a database that stores, for each location, a key and an IP address of CPE in association with each other, a search section that receives a CPE address request message including a key of a communication destination from CPE of a certain location and searches the database to acquire an IP address of CPE corresponding to the key of the communication destination, and a response section that transmits the IP address of the CPE acquired by the search section to the CPE that is a transmission source of the CPE address request message is provided.

Effects of the Invention

According to the disclosed technique, a technique to interconnect locations that enables not only a connectivity of communication to be achieved but also a desired service to be easily constructed is provided.

BRIEF DESCRIPTION OF DRAWINGS

FIG. 3 is a diagram illustrating a configuration example of a policy DB.

FIG. 5 is a diagram illustrating a configuration of a communication destination IP-CPE database.

DESCRIPTION OF EMBODIMENTS

Hereinafter, embodiments of the present invention will be described with reference to the drawings. The embodiments to be described below are merely exemplary, and an embodiment to which the present invention is applied is not limited to the following embodiments.

Overview of Embodiments

In order to solve the problems described above, the present embodiments introduce a database that holds a relationship between information to be used by a host to perform communication (hereinafter, a communication destination ID) and an IP address of the host corresponding to the communication destination ID or the location at which a content or the like is present, and a mechanism in which customer premises equipment (CPE) that connects a location to a network makes a query to the database via a controller disposed on the network when a host performs communication. The communication destination ID may be referred to as a key or a search key. In addition, the controller may be referred to as a control apparatus.

The CPE uses the IP address of a location corresponding to a communication destination ID obtained via the controller to encapsulate an original IP packet transmitted by a host and forwards the packet to CPE at the opposite location to achieve a closed network in an enterprise network.

The communication destination ID, which is a search key to be used for querying a database, is generalized and is not limited to only the existing IP address of a communication destination. For example, a content name or the like may be used. By introducing a database holding the relationship between a communication destination ID and the IP address of a location, it is possible to easily construct various services, such as a simple connectivity between locations of enterprises, mobility of a device, and a CDN.

Further, by using SRv6 as a technique of encapsulating an IP packet, it is possible to implement route specification or the like in a network, which is not included in the existing tunneling protocol, and achieve quality control in accordance with the content of communication. However, a technique of encapsulating an IP packet used in the present embodiments is not limited to SRv6, and other techniques may be used.

Configurations and operations according to embodiments of the present invention will be described in detail below. In the present embodiments described below, a case in which a communication destination ID is an IP address (endpoint ID or EID) held by a host (which may be referred to as a terminal) that is a communication destination and a case in which a communication destination ID is a URI of content will be described as examples.

In addition, it is assumed in the present embodiments that SRv6 is used as a method for encapsulating and transmitting IP packets between CPE as an example.

System Configuration

Figure 1:
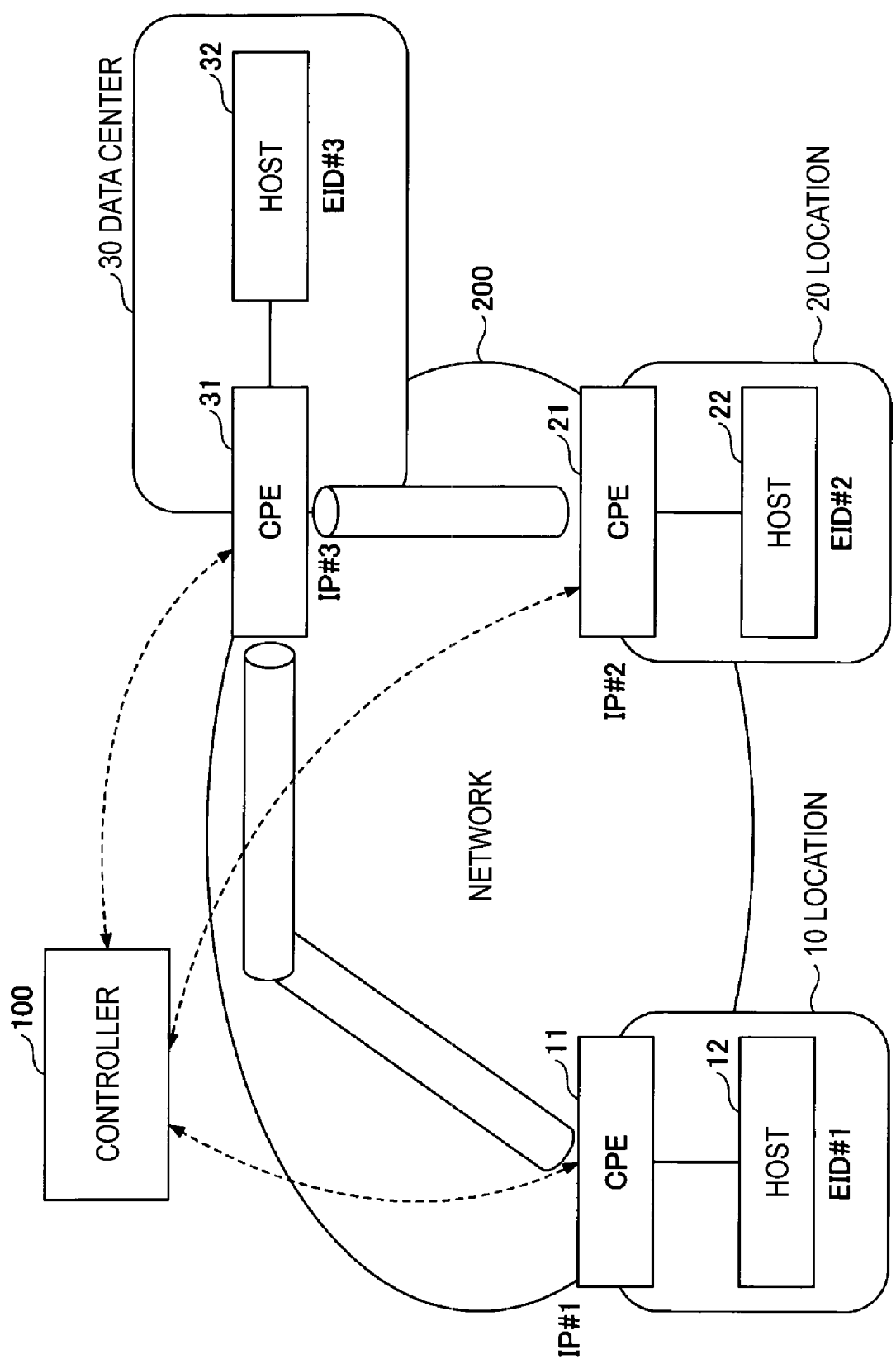
FIG. 1 is a diagram illustrating a configuration example of a system according to an embodiment of the present invention.

FIG. 1 illustrates a configuration example of a system according to the present embodiments. The present system is a communication system including a location 10, a location 20, a controller 100, and a data center 30 in a configuration in which these entities are connected on a network 200 as illustrated in FIG. 1. The data center 30 is one of locations.

Each location has CPE and a host, and the host is connected to the network 200 via the CPE. A "location" refers to a network including CPE and a single host connected to the CPE, or a network including CPE and a plurality of hosts connected to a LAN constructed under the CPE. Specifically, examples of a "location" include, for example, an internal network of an enterprise, a device having CPE-equivalent functions, a cluster network within a cloud (data center), and the like.

The controller 100 includes a database storing correspondences between the communication destination IDs and the IP addresses of locations. The IP address of a location is the IP address of CPE.

IP addresses of the hosts and CPE are shown in FIG. 1. The IP address of each host is denoted as "EID #1", and the like and is assumed to be an IPv6 address in the present embodiments. In addition, the IP address of each CPE is denoted as "IP #1", and the like and is assumed to be a globally routable IPv6 address in the present embodiments.

Configuration Example of Each Apparatus

CPE

Figure 2:
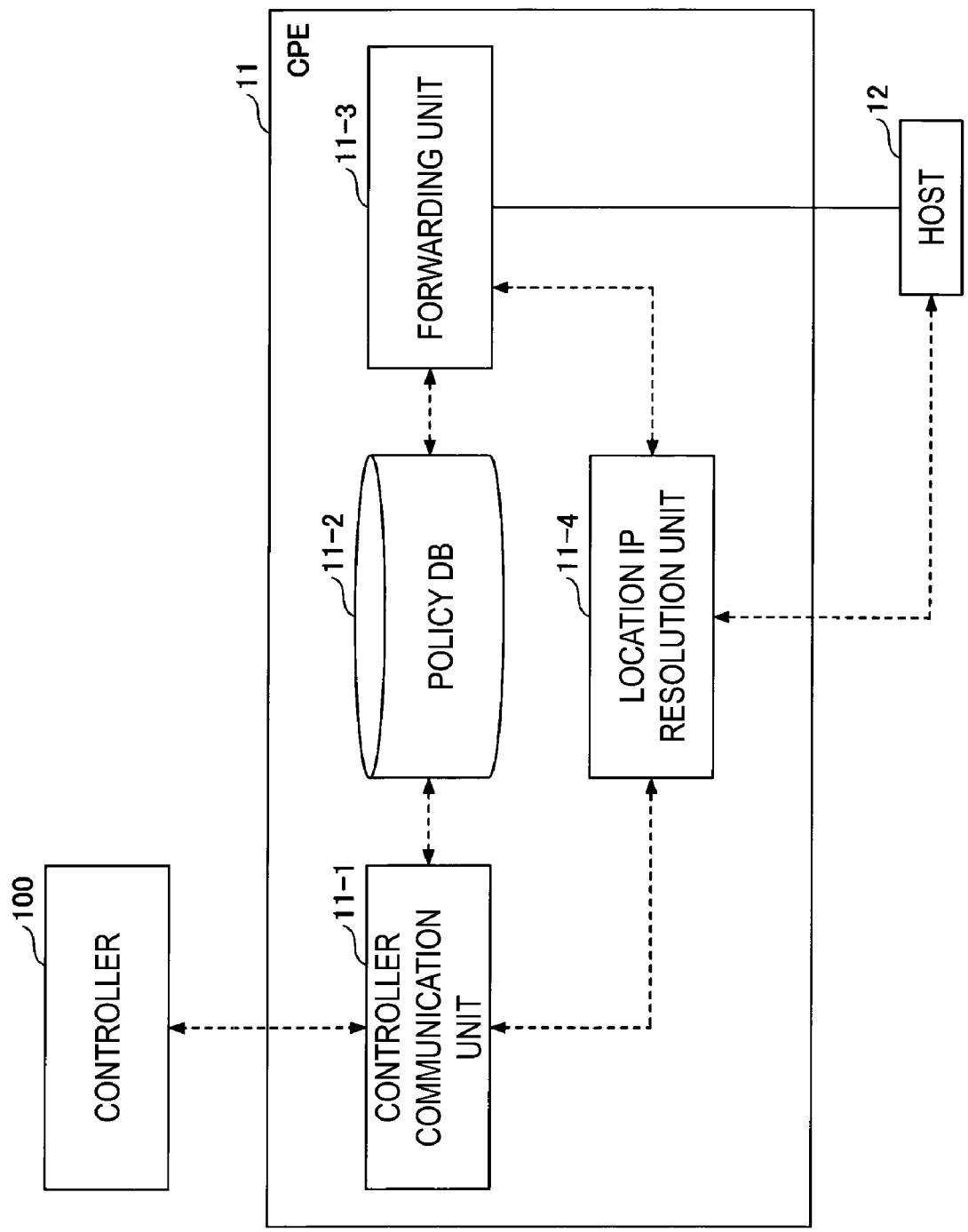
FIG. 2 is a diagram illustrating a configuration example of CPE.

FIG. 2 illustrates a configuration example of the CPE 11 at the location 10. The CPE 11 has a controller communication unit 11-1, a policy DB 11-2, a forwarding unit 11-3, and a location IP resolution unit 11-4 as illustrated in FIG. 2.

Here, although the CPE 11 is exemplified, the other CPE 21 and 31 also have similar configurations and functions to those of the CPE 11. In other words, the CPE 21 has a controller communication unit 21-1, a policy DB 21-2, a forwarding unit 21-3, and a location IP resolution unit 21-4, and the CPE 31 has a controller communication unit 31-1, a policy DB 31-2, a forwarding unit 31-3, and a location IP resolution unit 31-4.

The controller communication unit 11-1 is a functional unit that communicates with the controller 100 installed on the network 200. Although details of the operation will be described below, the controller communication unit 11-1 has a function of registering the location 10 including the CPE 11, a function of querying the IP address of the location of a communication destination based on the communication destination ID before the host 12 under the CPE 11 performs communication, and the like.

The policy DB 11-2 is a database that stores combinations of communication destination IDs obtained by making a query to the controller 100 and the IP addresses of CPE as the communication destinations.

The forwarding unit 11-3 has a function of performing communication to the network 200 side and a function of SRv6-encapsulation and decapsulation. In addition, the forwarding unit 11-3 holds a combination of a communication destination ID and the IP address of CPE as a communication destination in the form a forwarding table, similarly to the policy DB 11-2.

The location IP resolution unit 11-4 is a functional unit that resolves the IP address of CPE as a communication destination using the communication destination ID. The location IP resolution unit 11-4 makes a query to the controller 100 through the controller communication unit 11-1 when the IP address cannot be resolved (information is not held) locally by the CPE. A combination of a communication destination ID and the IP address of the CPE corresponding to the ID received from the controller 100 is stored in the policy DB 11-2, is notified to the forwarding unit 11-3, and is also entered in the forwarding table referred to when the packet is actually forwarded.

Further, the location IP resolution unit 11-4 has a different activation source depending on which is used for the communication destination ID. When the communication destination ID can be acquired from the header of the IP packet or the like transmitted by the host 12, the location IP resolution unit 11-4 is activated by the forwarding unit 11-3. The location IP resolution unit 11-4 is activated by a query from the host 12 when the communication destination ID is information that cannot be acquired from the IP header (e.g., a content name, a content URI, or the like).

The controller communication unit 11-1 has the function of transmitting a query for resolving the IP address of CPE using a communication destination ID to the controller 100, and a function of receiving information on the resolved IP address of the CPE. The controller communication unit 11-1 also has a function of registering information of the host 12 connected under the CPE 11 and information on the IP address information (of the CPE 11) in the controller 100.

FIG. 3 is a diagram illustrating an example of a configuration (a form of stored data) of the policy DB 11-2. The policy DB 11-2 is a database holding information of communication destination IDs and the IP addresses of the CPE corresponding to the communication destination IDs as shown in FIG. 3.

In the example of FIG. 3, the communication destination IDs serve as IP addresses (such as EID #2) assigned to the hosts used at each of the locations.

Controller

Figure 4:
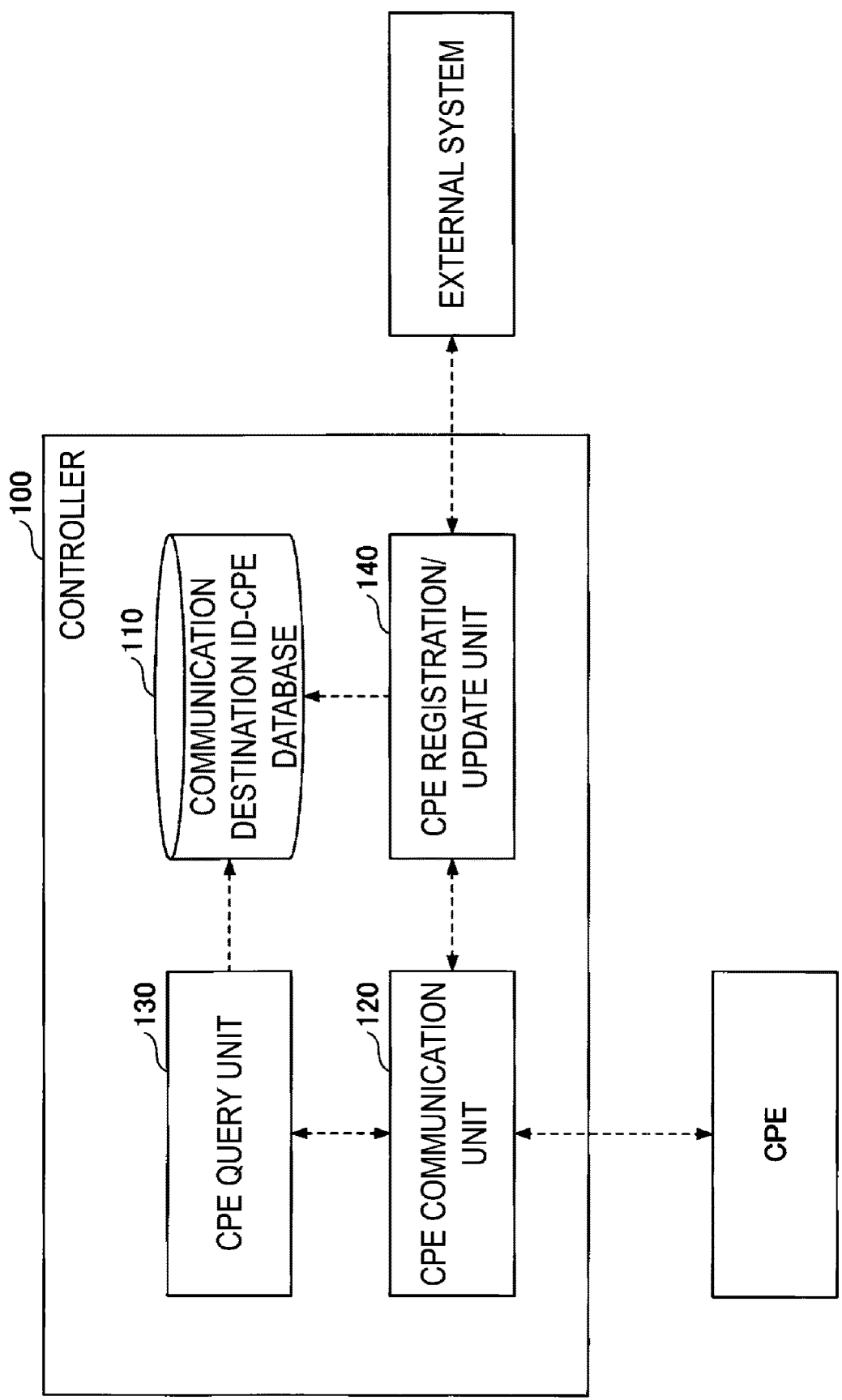
FIG. 4 is a diagram illustrating a configuration example of a controller.

FIG. 4 is a diagram illustrating a configuration example of the controller 100. The controller 100 includes a communication destination ID-CPE database 110, a CPE communication unit 120, a CPE query unit 130, and a CPE registration/update unit 140 as illustrated in FIG. 4. A section constituted by the reception function of the CPE communication unit 120, the CPE query unit 130, and the CPE registration/update unit 140 may be referred to as a search section. In addition, the transmission function of the CPE communication unit 120 may be referred to as a response section.

The communication destination ID-CPE database 110 is a database in which the correspondence between all the communication destination IDs present in the network 200 and the IP addresses of the CPE are recorded.

The CPE communication unit 120 is a communication functional unit that performs reception of a query from CPE, acceptance of registration and update, transmission of a response of a processing result, and the like.

The CPE query unit 130 is a functional unit that searches the communication destination ID-CPE database 110 when there is a query on the IP address of the CPE corresponding to a communication destination ID from CPE, acquires the IP address of the corresponding CPE, and responds to the query source CPE.

The CPE registration/update unit 140 is a functional unit that registers new information of correspondence between the communication destination ID related to CPE and the IP address of the CPE or updates existing information, when the CPE is newly connected to the network or a configuration of the CPE or information of the host is changed.

FIG. 5 illustrates a configuration example of the communication destination ID-CPE database 110 held by the controller 100. The communication destination ID-CPE database 110 holds information of communication destination IDs and the IP addresses of the CPE corresponding to the communication destination IDs as shown in FIG. 5. Although the format of information stored in the communication destination ID-CPE database 110 is the same as that of information stored in the policy DB held by each CPE shown in FIG. 3, the communication destination ID-CPE database 110 differs from the policy DB in that the communication destination ID-CPE database 110 holds all of the communication destination IDs existing on the network 200 and the information related to the CPE.

Hardware Configuration Example

Both the CPE and the controller 100 (hereinafter referred to collectively as "the apparatus") can be implemented by executing a program describing the processing content described in the present embodiments. Further, the "computer" may be a physical machine or a virtual machine. When a virtual machine is used, "hardware" mentioned here is virtual hardware.

The apparatus can be achieved by executing a program corresponding to processing performed by the apparatus using hardware resources such as a CPU and a memory built into the computer. The program can be recorded on a computer-readable recording medium (a portable memory or the like) to be stored or distributed. The program can also be provided via a network such as the Internet or an e-mail.

Further, the program may not include the function of a database. For example, by using a general database program to achieve the function of a database, a program to perform processing according to the present invention that does not have the function of a database may be recorded in a recording medium (such as a portable memory), stored, distributed, or provided through a network, such as the Internet or an e-mail.

Figure 6:
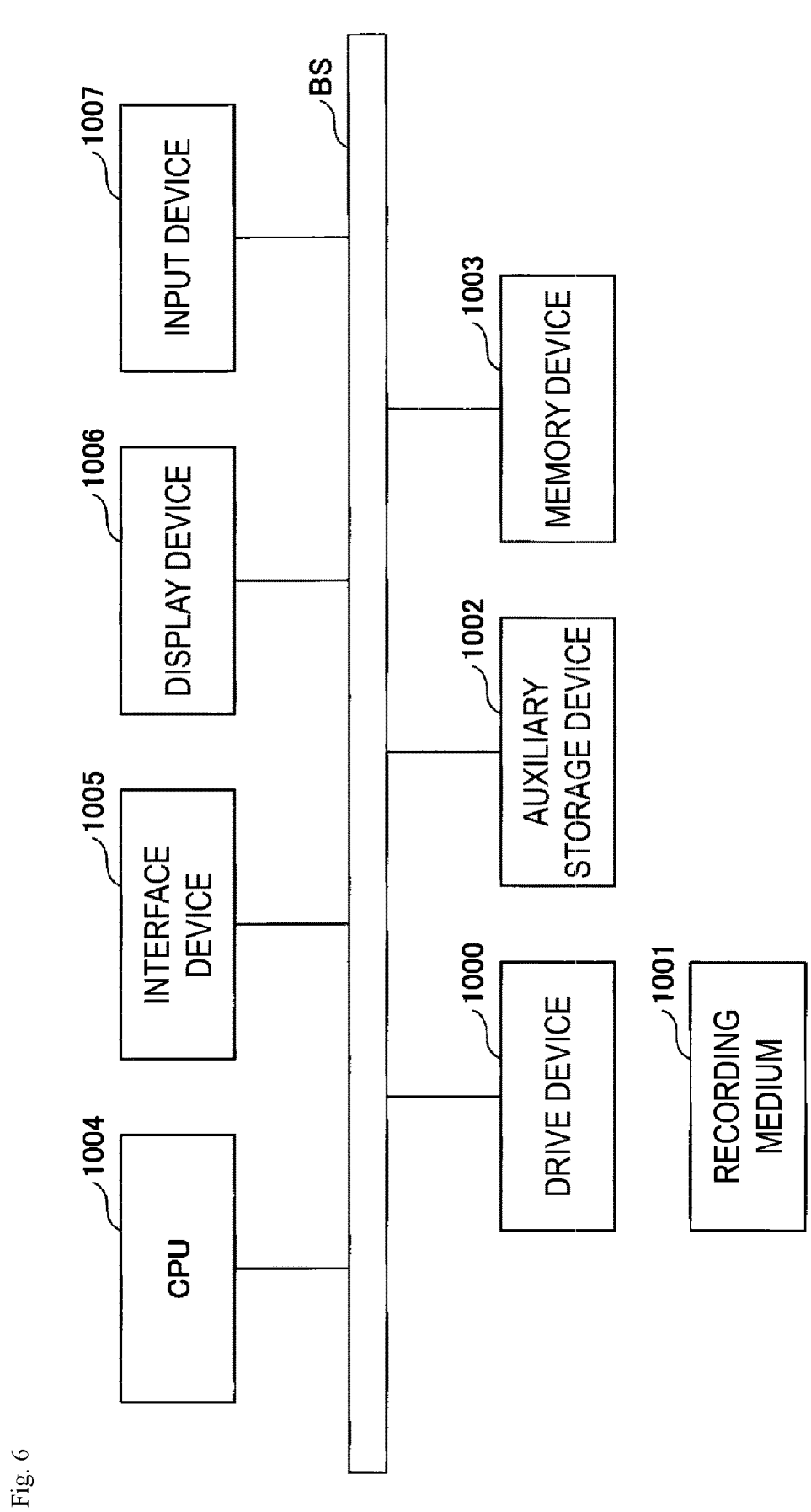
FIG. 6 is a diagram illustrating a hardware configuration example of an apparatus.

FIG. 6 is a diagram illustrating an example of a hardware configuration of the computer. The computer in FIG. 6 includes a drive device 1000, an auxiliary storage device 1002, a memory device 1003, a CPU 1004, an interface device 1005, a display device 1006, an input device 1007, and the like which are connected to each other through a bus B.

A program for realizing processing in the computer is provided by, for example, a recording medium 1001 such as a CD-ROM or a memory card. When the recording medium 1001 storing the program is set in the drive device 1000, the program is installed in the auxiliary storage device 1002 from the recording medium 1001 via the drive device 1000. Here, the program may not necessarily be installed from the recording medium 1001 and may be downloaded from another computer via a network. The auxiliary storage device 1002 stores the installed program and also stores necessary files, data, and the like.

The memory device 1003 reads the program from the auxiliary storage device 1002 and stores the program when an instruction to activate the program is given. The CPU 1004 achieves functions related to the apparatus in accordance with the program stored in the memory device 1003. The interface device 1005 is used as an interface for connection to a network. The display device 1006 displays a graphical user interface (GUI) or the like according to a program. The input device 1007 is constituted by a keyboard, a mouse, buttons, a touch panel, and the like, and is used to input various operation instructions. The input device 1007 and the display device 1006 may not be provided on the assumption of an operation via a network.

Operation Example

An operation example of the system according to the present embodiments will be described below.

Operation Example when Communication Destination ID is IP Address of Host First, an example of an operation when a communication destination ID is the IP address of a host (EID #1, etc.) will be described with reference to FIG. 7.

In the present operation example, it is assumed that the IP address of the CPE 21 (IP #2) corresponding to a host 22 (IP address=EID #2) has already been registered in the communication destination ID-CPE database 110 of the controller 100.

Figure 7:
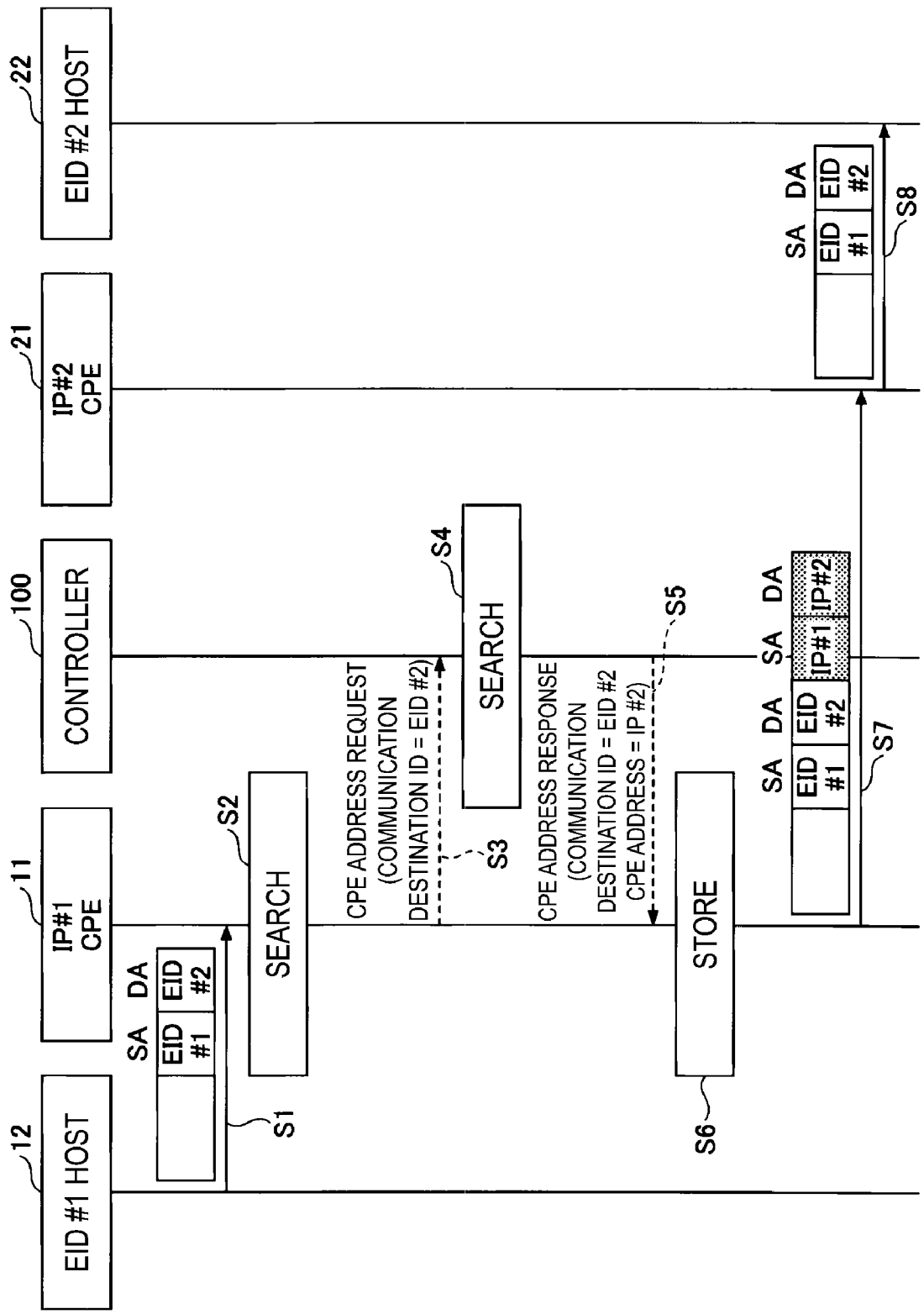
FIG. 7 is a sequence diagram illustrating an example of an operation when a communication destination ID is an IP address of a host.

In S1 (which indicates step 1 and the same applies hereinbelow), the host 12 transmits an IP packet to the host 22 as illustrated in FIG. 7. EID #2 that is the IP address of the host 22 is set as the destination address (DA) of the transmitted IP packet, and EID #1 that is the IP address of the host 12 is set as the transmission source address (SA). This operation is an operation by a normal host.

The forwarding unit 11-3 of the CPE 11 receives the IP packet. In S2, the forwarding unit 11-3 searches the policy DB 11-3 using the IP address (EID #2) of the host 22 that is the communication destination ID as a key. Here, it is assumed that there is no corresponding information in the policy DB 11-2 of the CPE 11.

In S3, the location IP resolution unit 11-4 of the CPE 11 transmits a CPE address request message in which "communication destination ID=EID #2" has been set to the controller 100 via the controller communication unit 11-1 to make a query to the controller 100 for the IP address of the CPE corresponding to the communication destination ID EID #2.

The CPE communication unit 120 of the controller 100 receives the CPE address request message. In S4, the CPE query unit 130 searches the communication destination ID-CPE database 110 using the communication destination ID (EID #2) included in the CPE address request message as a key. The CPE query unit 130 acquires IP #2 (the address of the CPE 21) as the address of the CPE corresponding to EID #2.

At this time, the CPE query unit 130 of the controller 100 may search the communication destination ID-CPE database 110 in addition to information other than the communication destination ID used as a search key, such as the IP address of the CPE 11 that has given the query.

In S5, the CPE query unit 130 of the controller 100 sends a CPE address response message in which IP #2 has been set as the address of the CPE corresponding to "communication destination ID=EID #2" back to the CPE 11 via the CPE communication unit 120.

The controller communication unit 11-1 of the CPE 11 receives the CPE address response message. In S6, the controller communication unit 11-1 stores the CPE address IP #2 included in the CPE address response message as the CPE address corresponding to EID #2 that is the communication destination ID in the policy DB 11-2 and writes the CPE address IP #2 in the forwarding table that is actually used for forwarding.

In S7, the forwarding unit 11-3 of the CPE 11 adds the IP header with "destination address=IP #2, transmission source address=IP #1" to the IP packet transmitted from the host 12, then encapsulates the IP packet, and transmits the encapsulated IP packet. Here, although SRv6 is used as a protocol for encapsulation, other encapsulation protocols such as IP-in-IP, GRE, IPsec, etc. may be used.

The forwarding unit 21-3 of the CPE 21 that has received the encapsulated IP packet performs decapsulation (a process of removing the outer IP header and extracting the content of the IP packet). As a result, the IP packet (transmitted by the host 12) with the destination address of EID #2 is extracted, and then the forwarding unit 21-3 of the CPE 21 forwards the IP packet to the host 22 in S8. The host 22 receives the IP packet.

When the forwarding unit 21-3 of the CPE 21 receives the encapsulated IP packet, the information of the outer and inner IP headers may be registered in the policy DB 21-2 of the CPE 21. If, for example, the transmission source address in the outer IP header (the transmission source address of the CPE 11) and the transmission source address in the inner IP header (EID of the host 12) of the encapsulated packet received by the CPE 21 are registered in the policy DB 21-2 of the CPE 21 itself as a policy to be used in return communication from the host 22 to the host 12, a query to the controller 100 when the IP packet from the host 22 to the host 12 is processed can be omitted.

Example Operation of Registering Information of CPE in Controller

Figure 8:
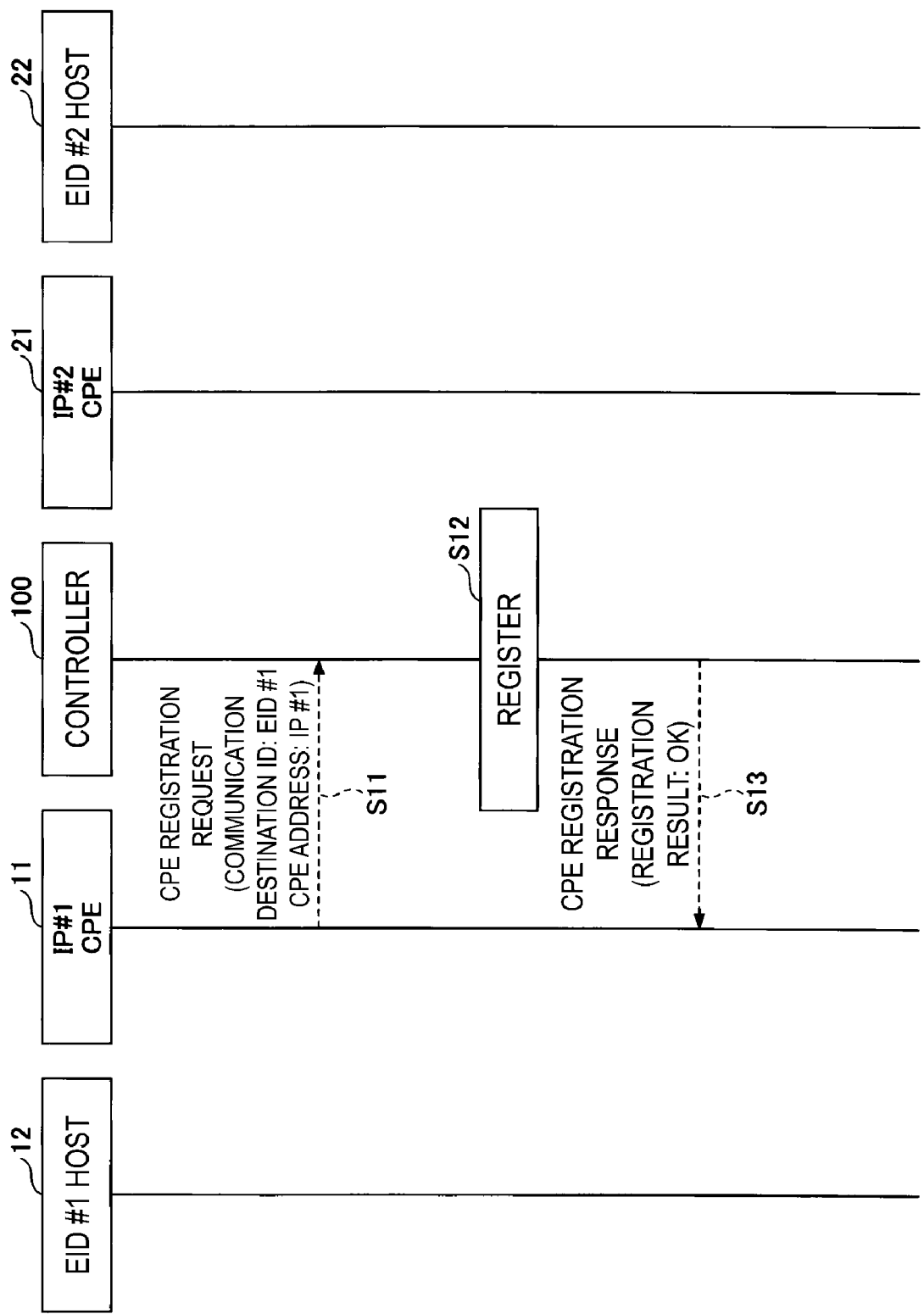
FIG. 8 is a diagram illustrating an example of an operation for registering CPE information in a controller.

Next, an example of an operation when information of CPE is registered in the controller 100 when the CPE is newly connected to the network 200 or the IP address of the host under the CPE is changed will be described with reference to FIG. 8.

Here, an example in which the host 12 with an IP address (communication destination ID) of EID #1 is connected under the CPE 11 and the CPE 11 is newly connected to a network will be described.

When the CPE 11 is connected to the network 200, the CPE 11 is assigned with an IP address by the network 200. Here, it is assumed that IP #1 is assigned. Then, in S11, the controller communication unit 11-1 of the CPE 11 transmits a CPE registration request message in which "communication destination ID=EID #1" and "CPE address=IP #1" have been set to the controller 100.

The CPE communication unit 120 of the controller 100 receives the CPE registration request message. In S12, the CPE registration/update unit 140 of the controller 100 ascertains that information corresponding to "CPE address=IP #1" is not stored in the communication destination ID-CPE database 110 through a search, and registers "communication destination ID=EID #1" and "CPE address=IP #1" in the database 110.

At this time, in a case in which the information corresponding to "CPE address=IP #1" has already been registered in the database 110 and the communication destination ID of the newly received CPE registration request message is different from the communication destination ID registered in the database 110, the CPE registration/update unit 140 determines that the information of the host 12 under the CPE 11 has been updated, and updates the information of the communication destination ID corresponding to "CPE address=IP #1".

The CPE registration/update unit 140 of the controller 100 sends a CPE registration response message in which "registration result=OK" is described back to the CPE 11 via the CPE communication unit 120 to notify the CPE 11 of the fact that the information of the communication destination ID and the CPE address has been successfully registered in the database 110.

Example of Operation when CPE Moves

Next, an operation example of a use case of mobility in which CPE and the host under the CPE (i.e., a location) move will be described with reference to FIG. 9. This example is based on the assumption of, for example, a configuration of a connected car in which on-vehicle CPE is mounted and a host-equivalent sensor device or the like is connected to the CPE, or the like.

Figure 9:
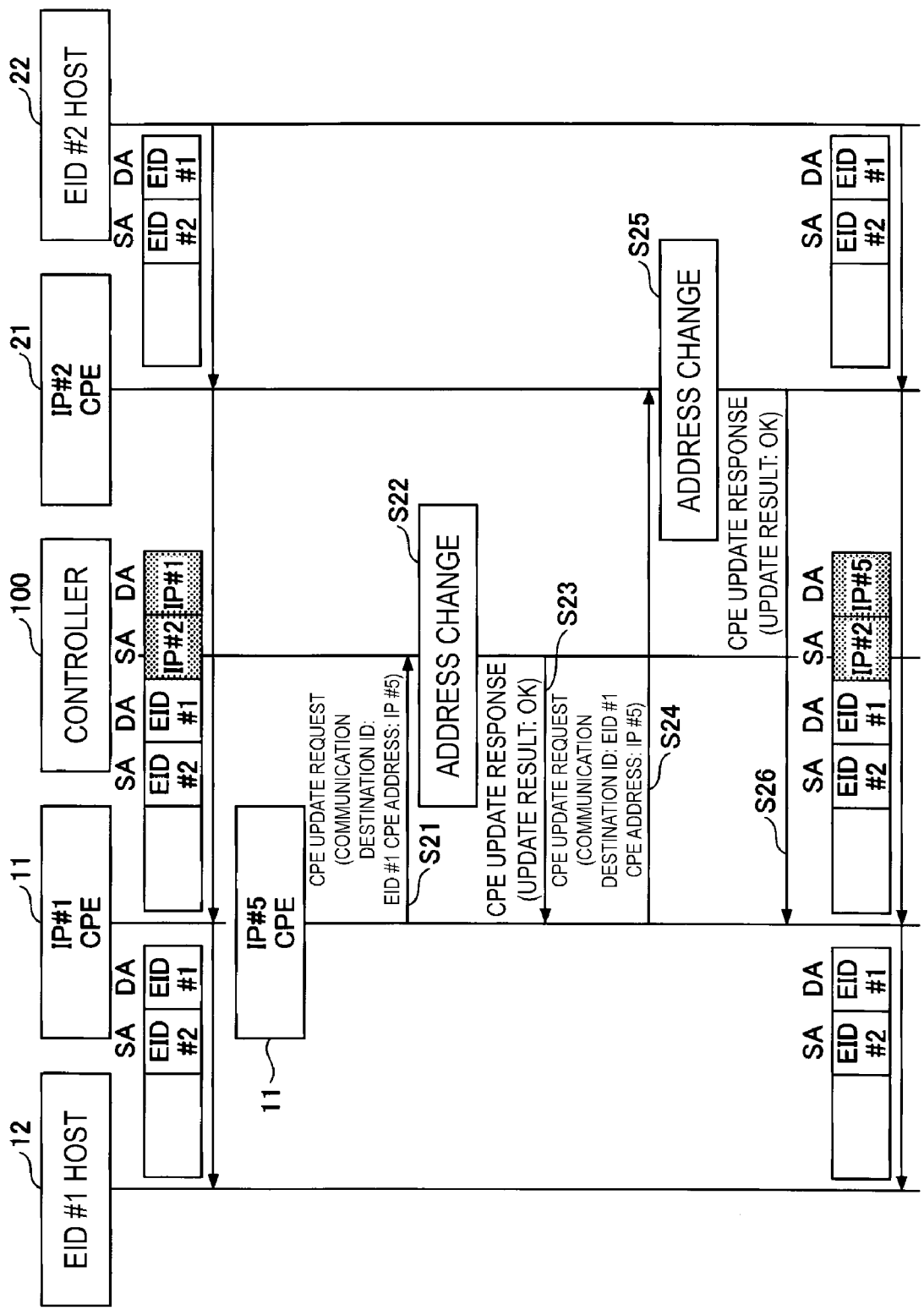
FIG. 9 is a diagram illustrating an example of an operation when CPE moves.

The example illustrated in FIG. 9 starts from a scene in which the CPE 11 with IP #1 assigned as an IP address moves to another network and is newly assigned with IP #5 (the IP address is changed). The network 200 illustrated in FIG. 1 is constituted by a plurality of networks, and "move to another network" mentioned here refers to moving from a network with IP #1 assigned as an IP address to another network assigned with another IP address.

The controller communication unit 11-1 of the CPE 11 transmits a CPE update request message to the controller 100 in S21, triggered by assignment (change) of a new IP address to the CPE 11. The content of the message is the same as the CPE registration request message including "communication destination ID=EID #1" and "CPE address=IP #5". The CPE address is IP #5 that is a new IP address assigned to the CPE 11.

The CPE communication unit 120 of the controller 100 receives the CPE update request message. In S22, the CPE registration/update unit 140 searches the communication destination ID-CPE database 110 using the communication destination ID as a key and updates the CPE address of the corresponding record from IP #1 to IP #5.

In S23, the CPE registration/update unit 140 of the controller 100 transmits a CPE update response message indicating that the database 110 has been updated to the CPE 11 via the CPE communication unit 120. The content of the message is "update result=OK" indicating that the database has been successfully updated.

The CPE 11 that has received the CPE update response message from the controller 100 transmits a CPE update request message, which is similar to that transmitted to the controller 100, to the CPE 21 which is the partner with which the forwarding unit 11-3 has communicated so far in S24. Here, it is assumed that communication has been performed with the CPE 21 before the IP address of the CPE 11 is changed (before the CPE 11 moves). Thus, the forwarding unit 11-3 of the CPE 11 transmits the CPE update request message in which "communication destination ID=EID #1" and "CPE address=IP #5" are described to the CPE 21.

The forwarding unit 21-3 of the CPE 21 that has received the CPE update request message searches its own policy DB 21-2 using "communication destination ID=EID #1" as a key and updates the corresponding CPE address (the address of the CPE 11) from IP #1 to IP #5 in S25. At the same time, the forwarding unit 21-3 updates its own forwarding table as well.

After the updating of the policy DB 21-2 and the forwarding table for the CPE 21 is completed, the forwarding unit 21-3 sends a CPE update response message indicating that the updating has been successfully completed (in which "update result=OK" is described) back to the CPE 11 in S26.

Thus, when communication from the host 22 to the host 12 is performed, the CPE 21 can encapsulate a packet with the changed IP address of the CPE 11 and continue the communication successfully.

The reason for transmitting the CPE update request message from the CPE 11 directly to the CPE 21 is to update the policy DB 21-2 and the forwarding table of the CPE 21 earlier to be able to perform communication immediately after the CPE 11 moves.

When starting communication with the CPE 11, the CPE 21 requests the controller 100 for the address of the CPE 11 and writes the address in its policy DB 21-2, as in the operation example of FIG. 7. If the CPE update request message is transmitted from the CPE 11 indirectly to the CPE 21, there is no way for the CPE 21 to know that the IP address of the CPE 11 has been changed even if the CPE 11 moved and its IP address has been changed after the transmission, and thus IP packets fail to reach the partner because the IP address of the CPE 11 would have already been changed to IP #5 even though communication is continued with the old IP address (IP #1 in FIG. 9) of the CPE 11. The CPE update request message is designed to be transmitted from the CPE 11 directly to the CPE 21 in order to avoid the failure.

Operation Example in Case of Application to CDN

Next, an operation example when the technique according to the present embodiments is applied to a CDN will be described with reference to FIG. 10.

In the present operation example, a URI of content is used as a communication destination ID, and the IP address of the CPE at the location at which a cache of the corresponding content is stored is used as a CPE address.

In addition, logic of the CDN, i.e., the algorithm for determining which content of a cache is to be deployed at which location among many locations is held by the controller 100. The algorithm itself is not limited to a particular algorithm, and a generally used algorithm (for disposing popular content in many locations, etc.) can be used.

Further, in the present operation example, the communication destination ID-CPE database 110 of the controller 100 stores information specifying content (a URI in this example) as a communication destination ID and stores the IP address of CPE and the IP address (EID) of hosts in association with the information.

Figure 10:
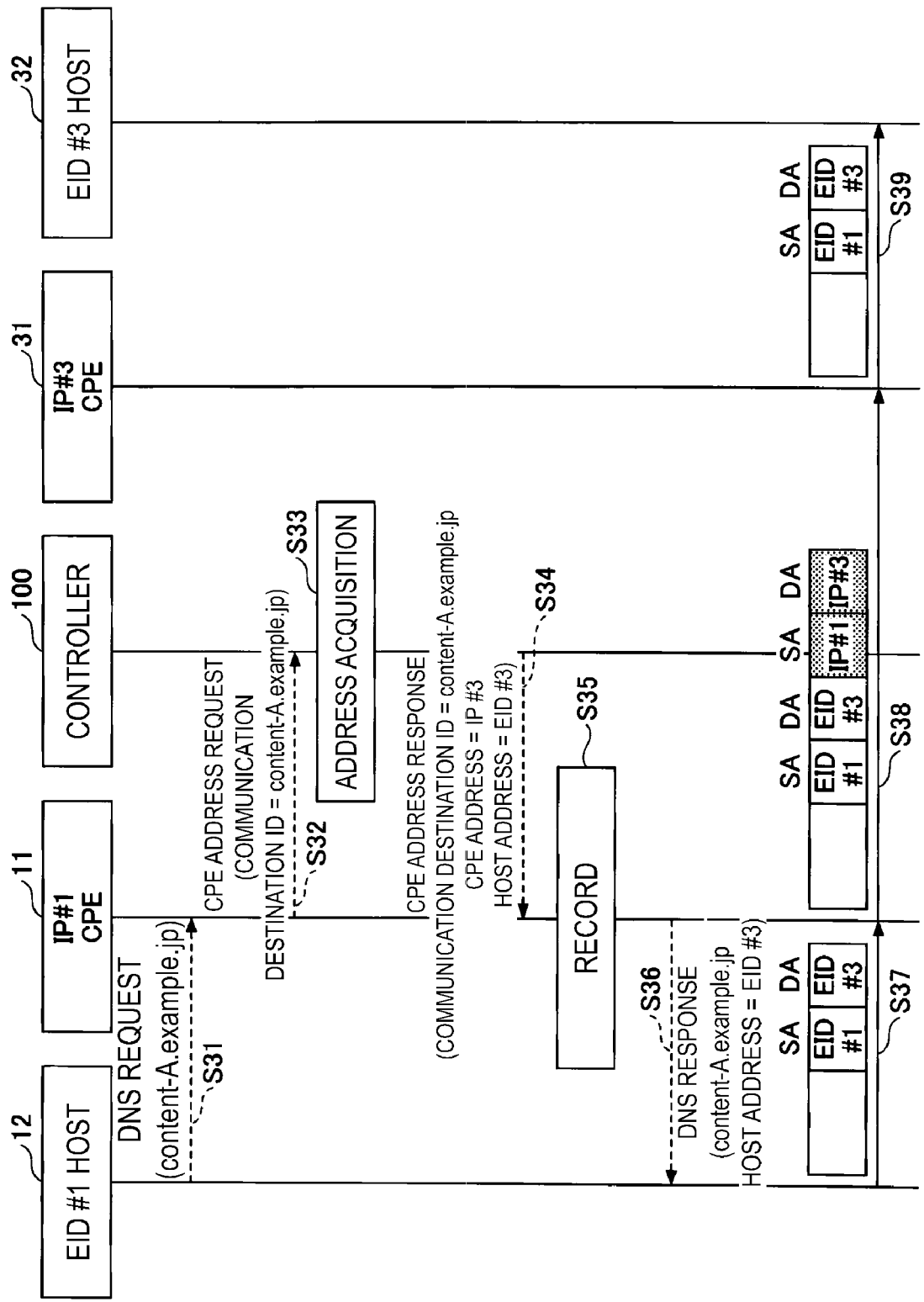
FIG. 10 is a diagram illustrating an example of an operation when a technique according to an embodiment is applied to a CDN.

In S31 of FIG. 10, the host 12 transmits a query of content-A.example.jp to a DNS server to access content-A.example.jp. content-A.example.jp is an example of a URI as information specifying content.

A CPE at each location is designated as the DNS server of the host at each location, and in this case, the CPE 11 receives a DNS query from the host 12.

In S32, the controller communication unit 11-1 of the CPE 11 transmits a CPE address request to the controller 100 with the URI (content-A.example.jp) of the content described in the DNS query as a communication destination ID.

The CPE query unit 130 of the controller 100 that has received the CPE address request searches the communication destination ID-CPE database 110 to acquire "CPE address=IP #3" and a host address of EID #3 corresponding to "communication destination ID=content-A.example.jp" in S33.

Logic of a general CDN is used for generation of the database 110 as described above, and it is assumed in the present operation example that the database 110 is generated in advance, in other words, a cache of content is stored at each location and the information is stored in the database 110.

In S34, the CPE query unit 130 of the controller 100 transmits "CPE address=IP #3" and "host address=EID #3" corresponding to "communication destination ID=content-A.example.jp" as a CPE address response message to the CPE 11. Here, the reason for the transmission to the CPE 11, including not only the CPE address (IP #3) but also the host address (EID #3) is that the information will be used in a DNS response (response to the DNS query) from the CPE 11 to the host 12.

The controller communication unit 11-1 of the CPE 11 that has received a CPE address response first stores "communication destination ID=content-A.example.jp" as a domain name (FQDN) and "host address=EID #3" as an IP address in a DNS cache of the CPE 11 in S35. Further, the DNS cache is held in the controller communication unit 11-1 of the CPE 11, for example.

In addition, the controller communication unit 11-1 writes "host address=EID #3" and "CPE address=IP #3" as a communication destination ID in its own policy DB 11-2 and forwarding table (S35).

In S36, the controller communication unit 11-1 of the CPE 11 returns the host address EID #3 corresponding to content-A.example.jp as a DNS response to the DNS query from the host 12.

Thus, because the IP address (EID #3) for the URI has been resolved by the host 12, the host 12 transmits an IP packet with "destination address=EID #3" and "transmission source address=EID #1" in S37.

The CPE 11 that has received this packet searches its policy DB 11-2 (forwarding table) for "communication destination ID=EID #3", acquires IP #3 as the corresponding CPE address (entry written in S35), encapsulates the original packet with "destination address=IP #3" and "transmission source address=IP #1", and transmits the packet to a CPE 31 in S38. Thereafter, the CPE 31 performs a decapsulation process and transmits the original IP packet to a host 32 in S39, similarly to the processes described above, and thereby communication is established.

Whereas the CPE 11 is able to transmit the CPE address request message to the controller 100 by using only the header information of the IP packet received from the host 12, specifically, the destination address (EID #2) of the IP packet in the operation example of mobility described with reference to FIG. 7, the operation example for the CDN described with reference to FIG. 10 has a difference in that the CPE address request message is transmitted based on the content of the DNS query from the host 12.

As described above, in the operation example of FIG. 10, the communication destination ID-CPE database 110 of the controller 100 uses the URI as a communication destination ID serving as a search key. Because it is not possible to know the URI only from information of the IP header, the CPE 11 is designed to know the URI serving as a communication destination ID when the CPE 11 relays the DNS query from the host in the present example.

Although the DNS is used for the protocol of the query between the host and the CPE in the operation example of FIG. 10, this is an example, and another protocol or a proprietary protocol may be used. Generally, a protocol can be selected according to what information will be used as a communication destination ID held by the controller 100.

Effects of Embodiments

As described above, the mechanism in which the communication destination ID held by the controller 100 is generalized and a query can be made using various IDs has been introduced in the present embodiments. As a result, various communication services can be achieved on the same platform, such as a closed network such as a simple IP-VPN or SD-WAN, as well as a mobility function of moving CPE, a CDN using a URI or a content name as a communication destination ID.

In addition, because a communication service provider provides the controller 100, CPE, and the like and a user company that uses the service sets a communication destination ID and adds a query mechanism between hosts and CPE, a service that would require comprehensive development including a network in the related art can be easily built up and a significant reduction in development costs and development periods can be achieved.

Summary of Embodiments

The present specification describes at least a control apparatus, a communication system, a control method, and a program described in the following items.

Item 1

A control apparatus configured to control communication between a plurality of locations, the control apparatus including:

a database configured to store, for each of the plurality of locations, a key and an IP address of CPE in association with each other;

a search section configured to receive a CPE address request message including a key of a communication destination from first CPE of a certain location of the plurality of locations and search the database to acquire an IP address of second CPE corresponding to the key of the communication destination; and a response section configured to transmit the IP address of the second CPE acquired by the search section to the first CPE that is a transmission source of the CPE address request message.

Item 2

The control apparatus according to item 1, wherein the search section receives, from the CPE of a changed location that is a location with an IP address of the CPE changed, a CPE update request message including a key of the changed location and the IP address changed and searches the database to update the IP address of the CPE corresponding to the key of the changed location to the IP address changed.

Item 3

The control apparatus described in item 1 or 2, wherein the search section receives the CPE address request message including information specifying a content as the key of the communication destination and searches the database to acquire the IP address of the second CPE corresponding to the key of the communication destination and an IP address of a host of a location of the communication destination, and the response section transmits the IP address of the second CPE acquired by the search section and the IP address of the host of the location of the communication destination to the first CPE that is the transmission source of the CPE address request message.

Item 4

A communication system including:

a control apparatus configured to control communication between a plurality of locations, first CPE at a first location of the plurality of locations, and second CPE at a second location of the plurality of locations, wherein the control apparatus includes a database configured to store, for each of the plurality of locations, a key and an IP address of CPE in association with each other, a search section configured to receive a CPE address request message including a key of a communication destination from the first CPE and search the database to acquire an IP address of the second CPE corresponding to the key of the communication destination, and a response section configured to transmit the IP address of the second CPE acquired by the search section to the first CPE, and the first CPE adds, to a packet received from a host of the first location, the IP address of the second CPE as a transmission destination address, adds the IP address of the first CPE as a transmission source address, and transmits a packet to which the transmission destination address and the transmission source address are added.

Item 5

The communication system described in item 4, wherein when the IP address of the first CPE is changed, the search section receives, from the first CPE, a CPE update request message including a key of the first location and an IP address changed and searches the database to update the IP address of the first CPE corresponding to the key of the first location to the IP address changed, and the first CPE transmits to the second CPE an update request message including the key of the first location and the IP address changed.

Item 6

The communication system described in item 4 or 5, wherein when the first CPE receives information specifying a content from the host of the first location, the search section receives a CPE address request message including the information specifying the content as a key of the communication destination from the first CPE and searches the database to acquire an IP address of third CPE corresponding to the key of the communication destination and an IP address of a host of a third location of the plurality of locations that is a location of the communication destination, the response section transmits the IP address of the third CPE acquired by the search section and the IP address of the host of the third location to the first CPE that is the transmission source of the CPE address request message, and the first CPE transmits the IP address of the host of the third location to the host of the first location.

Item 7

A control method performed by a control apparatus configured to control communication between a plurality of locations, the control apparatus including a database that stores, for each of the plurality of locations, a key and an IP address of CPE in association with each other, the control method including:

receiving a CPE address request message including a key of a communication destination from first CPE of a certain location of the plurality of locations and searching the database to acquire an IP address of second CPE corresponding to the key of the communication destination; and transmitting the IP address of the second CPE acquired by the searching to the first CPE that is a transmission source of the CPE address request message.

Item 8

A program causing a computer to operate as an individual section of the control apparatus described in any one of items 1 to 3.

Although the present embodiments have been described above, the present invention is not limited to such a specific embodiment, and various modifications and changes can be made within the scope of the gist of the present invention described in the claims.

REFERENCE SIGNS LIST

11, 21, 31 CPE
12, 22, 32 Host
10, 20 Location
30 Data center
100 Controller
200 Network
11-1, 21-1, 31-1 Controller communication unit
11-2, 21-2, 31-2 Policy DB
11-3, 21-3, 31-3 Forwarding unit
11-4, 21-4, 31-4 Location IP resolution unit
110 Communication destination ID-CPE database
120 CPE communication unit
130 CPE query unit
140 CPE registration/update unit
1000 Drive device
1001 Recording medium
1002 Auxiliary storage device
1003 Memory device
1004 CPU
1005 Interface device
1006 Display device
1007 Input device

The invention claimed is:

1. A control apparatus configured to control communication between a plurality of locations, the control apparatus comprising:

a database configured to store, for each of the plurality of locations, a respective key for identifying a respective content and a respective IP address of a respective Customer Premises Equipment (CPE) in association with each other, wherein the respective key comprises a respective Uniform Resource Identifier (URI) of the respective content;

a search section, including one or more processors, configured to (i) receive a CPE address request message including a key identifying a target URI from a first CPE of a certain location of the plurality of locations and (ii) search the database to acquire an IP address of a second CPE corresponding to the key identifying the target URI; and a response section, including one or more processors, configured to transmit the IP address of the second CPE acquired by the search section to the first CPE that is a transmission source of the CPE address request message.

2. The control apparatus according to claim 1, wherein the search section is configured to receive, from a CPE of a changed location that is a location with an IP address of the CPE changed, a CPE update request message including a key of the changed location and the IP address changed and search the database to update the IP address of the CPE corresponding to the key of the changed location to the IP address changed.

3. A communication system comprising:

a control apparatus configured to control communication between a plurality of locations, a first Customer Premises Equipment (CPE) at a first location of the plurality of locations, and a second CPE at a second location of the plurality of locations, wherein the control apparatus includes
a database configured to store, for each of the plurality of locations, a respective key for identifying a respective content and a respective IP address of a respective CPE in association with each other, wherein the respective key comprises a respective Uniform Resource Identifier (URI) of the respective content,
a search section, including one or more processors, configured to (i) receive a CPE address request message including a key identifying a target URI from a first CPE of a certain location of the plurality of locations and (ii) search the database to acquire an IP address of a second CPE corresponding to the key identifying the target URI, and
a response section, including one or more processors, configured to transmit the IP address of the second CPE acquired by the search section to the first CPE, and
the first CPE is configured to add, to a packet received from a host of the first location, the IP address of the second CPE as a transmission destination address, add the IP address of the first CPE as a transmission source address, and transmit a packet to which the transmission destination address and the transmission source address are added.

4. The communication system according to claim 3, wherein
when the IP address of the first CPE is changed, the search section is configured to receive, from the first CPE, a CPE update request message including a key of the first location and an IP address changed and search the database to update the IP address of the first CPE corresponding to the key of the first location to the IP address changed, and
the first CPE is configured to transmit to the second CPE an update request message including the key of the first location and the IP address changed.

5. A control method performed by a control apparatus configured to control communication between a plurality of locations,
the control apparatus including a database that stores, for each of the plurality of locations, a respective key for identifying a respective content and a respective IP address of a respective Customer Premises Equipment (CPE) in association with each other, wherein the respective key comprises a respective Uniform Resource Identifier (URI) of the respective content,
the control method comprising:
receiving a CPE address request message including a key identifying a target URI from a first CPE of a certain location of the plurality of locations and searching the database to acquire an IP address of a second CPE corresponding to the key identifying the target URI; and
transmitting the IP address of the second CPE acquired by the searching to the first CPE that is a transmission source of the CPE address request message.

6. A non-transitory computer-readable medium storing a program that causes a computer to operate as an individual section of the control apparatus according to claim 1.

7. A non-transitory computer-readable medium storing a program that causes a computer to operate as an individual section of the control apparatus according to claim 2.

8. The control method according to 5, further comprising:
receiving, from CPE of a changed location that is a location with an IP address of the CPE changed, a CPE update request message including a key of the changed location and the IP address changed and searching the database to update the IP address of the CPE corresponding to the key of the changed location to the IP address changed.

* * * * *